(No Model.)

A. L. EDWARDS.
MOSQUITO NET SUPPORT.

No. 300,855. Patented June 24, 1884.

WITNESSES:
Jas. F. DuHamel.
Walter S. Dodge.

INVENTOR:
Alfred L. Edwards
by Dodge Son,
Attys.

UNITED STATES PATENT OFFICE.

ALFRED L. EDWARDS, OF NEW YORK, N. Y.

MOSQUITO-NET SUPPORT.

SPECIFICATION forming part of Letters Patent No. 300,855, dated June 24, 1884.

Application filed May 22, 1883. (No model.)

*To all whom it may concern:*

Be it known that I, ALFRED LEWIS EDWARDS, of New York, in the county of New York and State of New York, have invented certain Improvements in Mosquito-Net Supports, of which the following is a specification.

My invention relates to portable mosquito-net supports, and is designed as an improvement upon that for which Letters Patent of the United States were granted to me bearing date August 15, 1876, and numbered 181,157, the improvement consisting in constructing the brackets each in two parts, hinged or jointed together and provided with a friction-clamp at the point of connection, whereby the two parts may be held in fixed relative positions, in providing said clamps with a series of turn-buttons to receive and sustain the end of the supporting-band, and in constructing said band in a series of independent sections provided with slots and turn-buttons, whereby they may be united.

Figure 1:
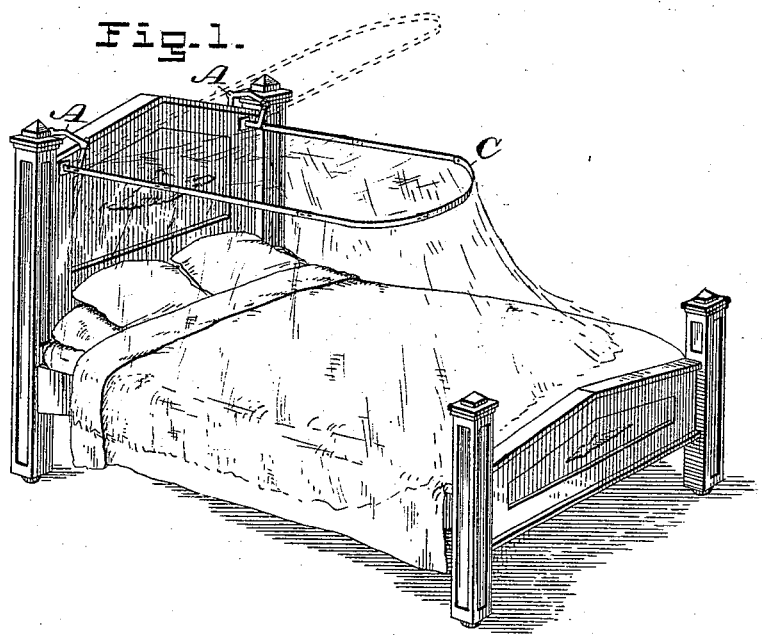
Figure 2:
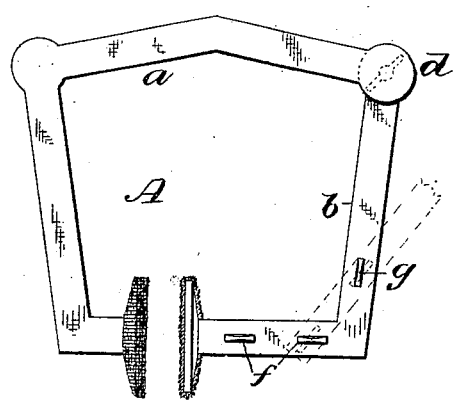
Figure 3:
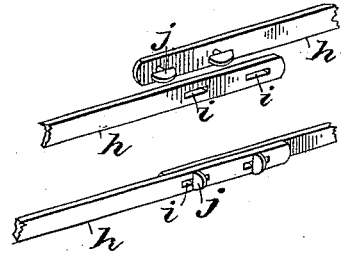
Figure 4:
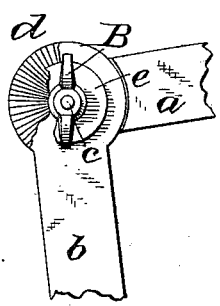

In the accompanying drawings, Figure 1 represents a perspective view of my improved supporting device applied to a bedstead; Fig. 2, an enlarged view of one of the brackets or supports; Fig. 3, a perspective view showing the ends of two sections of the supporting band or bar, and illustrating the manner of uniting them; Fig. 4, an enlarged view of the clamp by which the two parts of the bracket or support are united.

A represents the bracket or support, consisting of the two angular parts $a$ and $b$, connected by a pin or stem, $c$, rigidly attached to one of said parts and passing through a hole or opening in the other, as shown. The joining ends of the parts $a$ and $b$ are formed each with an enlargement, $d$, the opposing faces of which are radially serrated or notched, as indicated in Fig. 4, in order that when pressed firmly together they may be locked against movement one upon the other. For the purpose of thus locking the parts together the stem $c$ is threaded and provided with a thumb-nut, B, a washer, $e$, being interposed to receive the wear and pressure of the thumb-nut, as indicated. The part B of the bracket is provided with three turn-buttons, $f$ and $g$—two on the lower horizontal bar of said part, and the one $g$ on the upright bar, as shown in Fig. 1, the first two serving to support the band or bar in a horizontal position, and one of said first pair, together with the third one, serving to support the same in an inclined position, as indicated in dotted lines in Fig. 1, the latter arrangement permitting the nut to be raised and supported at any desired height from a low bedstead, or to be raised in making up the bed.

As shown in Fig. 3, the band C consists of separable sections $h$, provided alternately with slots $i$ and turn-buttons $j$, the latter adapted to pass through the former and to be turned across the same for the purpose of preventing the separation of the sections. The end of a section having the eyes is applied to the turn-buttons of the bracket or support, as shown in Fig. 1, and the turn-buttons turned at right angles to the eyes or slots to prevent the removal of the band, the several sections being in turn united and the whole bent in semicircular form to extend from one bracket to the other, the brackets being applied to the head of the bed on opposite sides of the center. Two, three, or more sections may be applied, though it is usually preferred to employ five, in order that a sufficiently long band may be secured without undue length of sections, the device being primarily designed for the use of travelers, it being therefore desirable to make the sections sufficiently short to be placed readily in a trunk, or even in a satchel.

It will be seen that other forms of clamp may be applied to the joint of the bracket, and that other fastening or connecting devices may be used for joining the ends of the band-sections, though the forms shown are deemed best, and will be found to answer a very good purpose in practice. The bearing ends of the bracket are formed with broad plates, which will in practice preferably be covered with plush, velvet, or other soft material, to avoid marring or injuring the polished surfaces of furniture. A device thus constructed may be carried in a very small space, quickly applied, and readily removed, the whole device, together with a net, being placed, ordinarily, in a small box, which may be readily carried in a trunk or satchel.

It is obvious that a single bracket may in some cases be employed above the ends of the band and applied directly thereto, though it will ordinarily be found preferable to employ the two separate brackets.

I am aware that a hinge-joint consisting of two disks having serrated faces and drawn together by a pivot-bolt is old, and I make no claim thereto, broadly considered; but, so far as I am aware, no one has ever before made a bracket adapted to be attached to an article of furniture and to support a mosquito-bar with a joint of this description; hence, while not claiming the joint, I do claim the bracket thus constructed.

Having thus described my invention, what I claim is—

1. The herein-described support for mosquito-nets, consisting of brackets A, each composed of two parts, $a$ and $b$, jointed together and provided with a clamp at the joint, and the band C, attached to and supported by said brackets, substantially in the manner shown.

2. In combination with supporting-brackets, substantially as described and shown, a flexible band composed of separable sections alternately provided at their ends with slots or eyes and turn-buttons, substantially as and for the purpose set forth.

3. The herein-described bracket for mosquito-canopies, consisting of the parts $a$ $b$, united by a friction-joint and provided with turn-buttons $f$ and $g$, as and for the purpose explained.

ALFRED L. EDWARDS.

Witnesses:
SOPHIA M. EDWARDS,
LEWIS EDWARDS.